Aug. 30, 1966 C. R. BRANDT ETAL 3,270,350
RECORDER
Original Filed July 17, 1961 3 Sheets-Sheet 1

INVENTORS
CARL R. BRANDT
ROBERT A. JANKOWICZ
ROBERT B. WATRONS
BY Arthur H. Swenson
ATTORNEY.

Aug. 30, 1966  C. R. BRANDT ETAL  3,270,350
RECORDER
Original Filed July 17, 1961  3 Sheets-Sheet 2

INVENTORS
CARL R. BRANDT
ROBERT A. JANKOWICZ
BY ROBERT B. WATRONS
ATTORNEY.

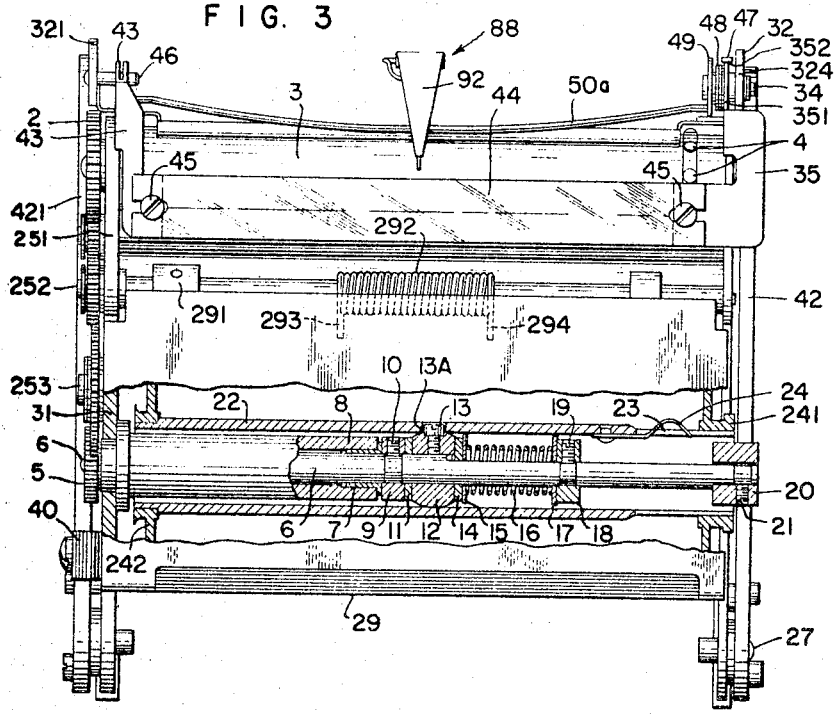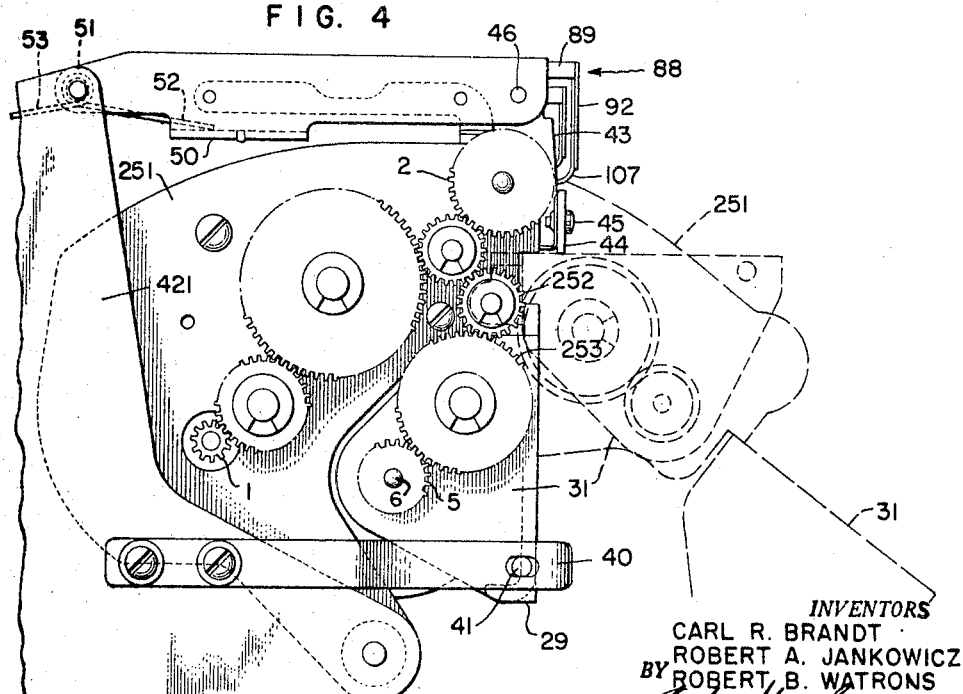

3,270,350
RECORDER
Carl R. Brandt, Oreland, Pa., Robert A. Jankowicz, Trenton, N.J., and Robert B. Watrons, Philadelphia, Pa., assignors to Honeywell Inc., a corporation of Delaware
Original application July 17, 1961, Ser. No. 124,512, now Patent No. 3,216,022, dated Nov. 2, 1965. Divided and this application Oct. 5, 1964, Ser. No. 407,949
5 Claims. (Cl. 346—136)

This is a division of application Serial No. 124,512, filed July 17, 1961, now Patent No. 3,216,022.

This invention relates to recorders and more specifically to strip-chart recorders having one or more pens.

These recorders have many novel and convenient features which form the objects of this invention.

One object of this invention is to provide means whereby a roll of chart paper can be simply placed in a shelf in the recorder and fitted over a time roller and over a take-up roller so that the chart roll is readily inserted into or removed from the recorder.

A further object of this invention is to provide means for lifting the pens and tearing off a portion of the chart.

An additional object of this invention is to provide means for driving the pens so that the pens are oscillated about a first axis and about a second axis at an angle to the first axis, so that each of the pens records in a substantially straight line.

Another object of this invention is to provide means whereby the ink is supplied to the pens continuously and whereby the flow of ink to the pens may be started whenever necessary such as after the recorder has been stopped for any considerable period of time.

Figure 1:
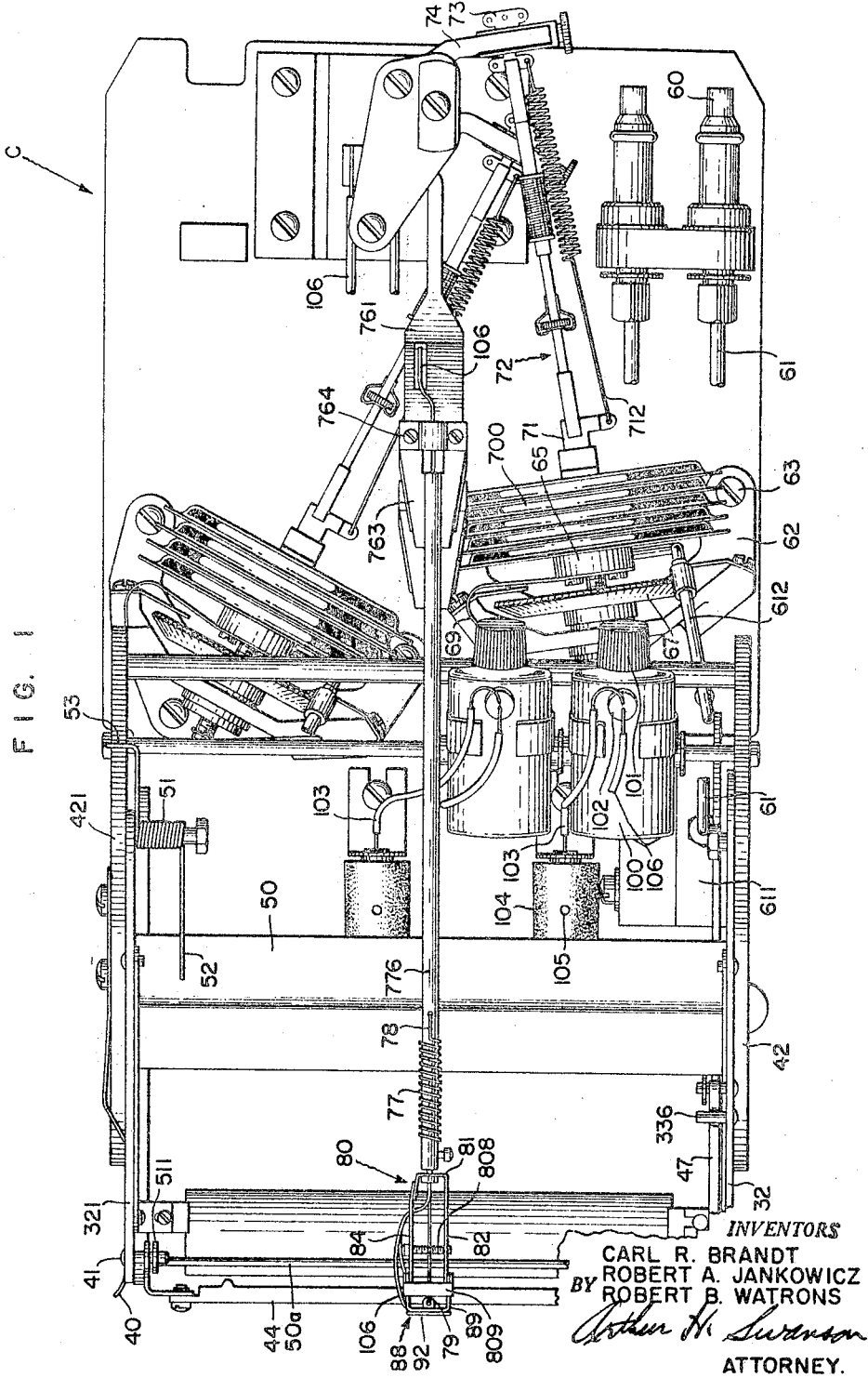
Figure 2:
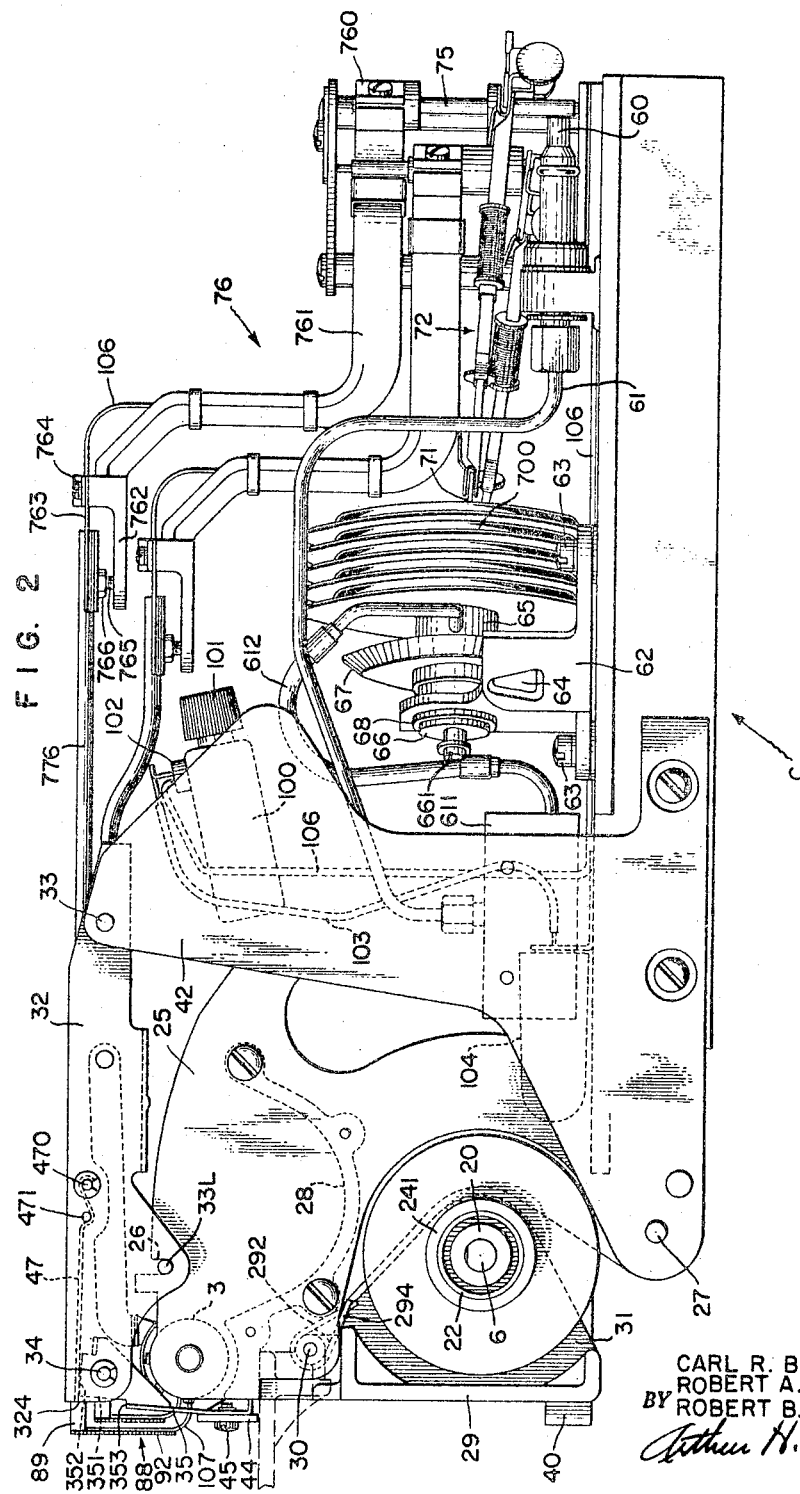

A better understanding of the present invention may be had from the following detailed description when read in connection with the accompanying drawings, in which:

FIG. 1 is a top or plan view.
FIG. 2 is a side elevation.
FIG. 3 is partially a front elevation of the strip chart tear-off mechanism and partially a vertical, cross section.
FIG. 4 is a partial side elevation opposite to the side of the mechanism shown in FIG. 2 showing the chart drive assembly.

All of the parts of the recorder referred to herein are mounted fixedly on or for movement relative to a chassis C.

*Chart Drive Mechanism*

The chart is a long strip of paper or other recording material which comes wound on a cardboard tube and which is drawn off from this cardboard tube, the record is made on the chart, the record is displayed, and the chart is then wound up on another cardboard tube by the recorder.

The means whereby the chart is drawn from one tube (known as the supply roll) to another tube (known as the take-up roll) are shown, especially in FIG. 4, and comprise a train of gearing having an input gear 1 adapted to mesh with a constant speed, electric motor (not shown). The input end of this chain of gearing is mounted on a flat plate 251. The train includes a gear 2 attached to a timing roller 3 (FIG. 3) which has a plurality of studs 4 on its outer surface adapted to engage with perforations in the chart. The gear train also includes a gear 252 mounted on plate 251 and meshing with a gear 253 mounted on a bracket 29. Gear 253 is adapted to oscillate about the axis of gear 252 and to remain in mesh therewith when the bracket 29 is rotated about its pivot 30 (FIG. 2).

Gear 253 drives output gear 5 which is mounted on the end of shaft 6 which drives the take-off roller through a clutch. Shaft 6 is mounted in wall 31 of bracket 29 by bearings including bearing 7 supported on tube 8.

FIG. 3 shows that this clutch comprises a collar 9 secured to shaft 6 by a screw 10 and bearing at its right hand end on a friction washer 11 which engages with one face of a hub 12 which supports a screw 13 which rides in a slot 13A in tube 22. Slot 13A is elongated in the direction of the axis of tube 22 so that the sides of the slot 13A engage the sides of the screw head 13 while the ends of the slot are not engaged with the head of screw 13. The right hand side of hub 12 engages with a second friction washer 14 which is engaged by a metal washer 15 which takes the stress of a compression spring 16. The opposite end of spring 16 bears on a second metal washer 17 which engages with a second collar 18 secured to shaft 6 by a set screw 19. The right hand end of shaft 6 carries a knob 20 secured thereto by a set screw 21. The right end of tube 22 has four slots 23 in it. Through one of these slots extends a bent leaf spring 24 adapted to engage with an opening in the cardboard tube on which the wound up roll of chart is located.

The operation of this clutch is as follows. Since hub 12 is free to rotate on shaft 6, when tube 22 is held by the tension of the chart, the hub 12 slips on the washers 11 and 14. This permits the driving train of gearing to drive shaft 6 without tearing the chart. This action permits the chart to wind up on the tube 22 so that the chart winding up on the tube is at various radii from the center of the tube. Shaft 6 is driven at a speed in excess of the fastest speed which tube 22 will turn in rolling up the chart.

Tube 22 carries rigidly thereon, at its left hand end, a disc 242 of plastic or the like and, at its right hand end, a second disc 241 also of plastic or the like. Disc 241 has a sliding fit with tube 22. Discs 241 and 242 serve to retain the roll of chart paper on the tube 22.

FIGS. 1 and 2 show that the chassis C has flat plates 42 and 421 mounted on it. A latch comprised of side plates 32 and 321 connected by cross plate 50 is pivoted at 33 on plates 42 and 421. The latch carries a latch pin 33L. Latch pin 33L cooperates with a notch 26 (FIG. 2) in plate 25 so that plate 25, timing roller 3, and take-up roller 22, which are carried by plates 25 and 251, are restrained from oscillating about pivot 27. A coil spring 51 (FIG. 1) is mounted on and bears at one end 53 against chassis C. The opposite end 52 of spring 51 bears on plate 50 and biases latch pin 33L for counter-clockwise movement into engagement with notch 26 (FIG. 2).

Bracket 29 is pivoted at 30 on plates 25 and 251 attached to trough 28. Bracket 29 has a triangular end plate 31 on it. End plate 31 supports tube 8 which supports shaft 6. A coil spring 292 (FIG. 3) has one end 293 bearing against trough 28 and one end 294 bearing against bracket 29. Spring 292 thus biases bracket 29 for movement in clockwise direction, as seen in FIG. 2. Bracket 29 is constrained against this clockwise movement by means of a latch comprised of a flat, leaf spring 40 attached to plate 421 by screws or other suitable means. Latch 40 has a hole in it through which passes a latch pin 41 mounted on triangular plate 31 which forms part of the bracket 29.

*Tear-off mechanism*

FIGS. 1, 2, 3 and 4 show the tear-off mechanism. This tear-off mechanism is mounted on the chassis at pivot 33 by means of a latch constituted by two flat plates 32 and 321 which are connected by a transverse plate 50. In plate 32 is mounted a pin 34 from which hangs a support 35 having a vertical flat face 351 and a horizontal flat face 352 (FIG. 2). These flat faces are adapted to cooperate with a leaf spring 47 mounted on the latch plate 32 by pins 470 and 471. Plate 321 carries pin 46 from which depends support 43. Tear-off bar 44 is mounted on supports 35 and 43 by screws 45.

Pen lifter mechanism

Pin 34 supports bracket 49 and pin 46 supports bracket 511 (FIG. 1). The pen lifter 50 is supported by brackets 49 and 511 and extends beneath the pens.

Operation of chart drive mechanism

As seen in FIG. 2, latch 40 is opened and bracket 29 rotated clockwise about pivot 30.

Starting from the position in which the device is shown in FIGS. 1, 2, 3 and 4, chart paper may be inserted into or removed from the recorder as follows.

The latch 40 is moved clockwise, as seen in FIG. 1, so as to move it from latch pin 41. This unlatches bracket 29 so that it can pivot clockwise, as seen in FIG. 2, about its pivot 30 and can expose take-up roller 22.

Support 35 is used as a handle and rocked clockwise (FIG. 2) about pins 34 and 46 from a vertical to a horizontal position. This disengages face 352 of support 35 from engagement with latch spring 47 and engages face 351 with latch spring 47. This also causes face 353 of support 35 to engage with face 324 at the end of plate 32 forming part of the latch formed of plates 32, 321 and 50. This causes support 35 to engage with and lift the latch clockwise.

This clockwise movement carries the pens with the latch by means of the engagement with the pen lifter 50 with the undersides of the pens. The pens are lifted away from the chart so that the chart may be inserted in or withdrawn from the recorder.

Clockwise movement of the latch also lifts latch pin 33L out of notch 26 in plate 25 so that plate 25, timing roller 3, and take-up roller 22, which are carried by plate 25, are free to oscillate about pivot 27. This counterclockwise pivoting movement permits the plate 25 to move forward from the position in which it is shown in FIG. 2 so as to expose the trough 28 carried thereby. The supply roll of chart paper may then be placed in or removed from the trough 28, laid over timing roller 3, and secured to or removed from a cardboard tube mounted on the take-up roller 22.

The mechanism may then be restored to the position in which it is shown in FIGS. 1, 2, 3 and 4 by moving the plates 25 and 251 clockwise about pivot 27 until pin 33L enters notch 26 and thereby latches the trough 28 in its normal position. Bracket 35 is then turned counter-clockwise about its pivot 34. Then bracket 29 is turned counter-clockwise about pivot 30 until pin 41 enters the hole in leaf spring 40. This latches the bracket 29 in its normal position.

What is claimed is:

1. In a strip chart recorder, a chassis, a pivot on said chassis, two spaced-apart plates, each of the plates being mounted at one of their end portions on said pivot for pivotal movement from a normal position to a loading position and vice versa, a trough fixedly connected to and extending between a portion of the two plates, a timing roller mounted on another of the end portions of the plates and adapted to have a chart applied thereto, a second pivot mounted on said plates at a position that is adjacent their last-mentioned end portions, a support member mounted on the second pivot, a take-up roller rotatably mounted on said support member for joint arcuate movement therewith about the second pivot from a normal position to a loading position thereon that is angularly displaced from the last-mentioned normal position and vice versa and the support member being adapted to have a take-up roll of chart placed thereon.

2. In a strip chart recorder, a chassis, a pivot means on said chassis, two spaced-apart plates, each of the plates being mounted at one of their end portions on said pivot means for movement about said pivot means from a normal operating position within the chassis to a loading position external to the chassis and vice versa, a trough fixedly connected to and extending between a portion of the two plates, and adapted to receive a supply roll of chart therein, a time roller mounted on another of the end portions of the plates and adapted to have the chart placed over the timing roller, a second pivot on the plates at a position that is adjacent their last-mentioned end portions, a take-up roller mounted by means of a support member on said second pivot, a spring biasing means extending between the trough and the support member to move the support member into engagement with the trough for joint movement therewith while the spaced-apart plates and trough is pivotally rotated about the pivot means from the position within the chassis to its loading position external of the chassis.

3. The strip chart recorder defined by claim 2, wherein a spring-biased latching member is employed to retain the support in a disengaged latch-open position with the trough when the spaced-apart plates and trough are in their normal with the chassis operating position and in an engaged latched closed position with the trough when the spaced-apart plates and trough are in their outside the chassis chart loading position.

4. In a strip chart recorder, a chassis, a pivot means on said chassis, two spaced-apart plates, each of the plates being mounted at one of their end portions on said pivot means for movement about said pivot means from a normal operating position within the chassis to a loading position external to the chassis and vice versa, a trough fixedly connected to and extending between a portion of the two plates, and adapted to receive a supply roll of chart therein, a time roller mounted on another of the end portions of the plates and adapted to have the chart placed over the timing roller, a second pivot on the plates at a position that is adjacent their last-mentioned end portions, a take-up roller mounted by means of a support member on said second pivot, a spring-biasing means extending between the trough and the support member to move the support member into engagement with the trough from a vertical front-of-recorder position that is out of engagement with the trough into a horizontal position that extends outwardly of the front of recorder for joint physical contacting movement with the trough while the spaced-apart plates and the trough is pivotally rotated about the pivot from the position within the chassis to the loading position external of the chassis.

5. In a strip chart recorder, a chassis, a pivot on said chassis, two spaced-apart plates, each of the plates being mounted at one of their end portions on said pivot for movement from a normal position to a loading position and vice versa, a trough fixedly connected to and extending between a portion of each of the two plates, a latch restraining said plates and trough in said normal position and detachable therefrom to permit movement of said plates and trough to said loading position, a timing roller mounted on another substantially opposite end portion of each of the plates and adapted to have a chart placed thereon, a support member pivotally mounted on a portion of each of the plates that are adjacent the said opposite end portion, and a take-up roller pivotally mounted on said support member for rotation thereon from a normal position to a chart loading position and said take-up roller being spaced from said timing roller and adapted to have a take-up roll of chart placed thereon.

References Cited by the Examiner

UNITED STATES PATENTS

| 2,663,609 | 12/1953 | Jones | 346—24 |
| 2,671,710 | 3/1954 | Bowditch | 346—136 X |
| 2,902,332 | 9/1959 | Bauer | 346—136 |
| 2,913,299 | 11/1959 | Clift | 346—136 X |

FOREIGN PATENTS 845,523  8/1960  Great Britain.

LOUIS J. CAPOZI, *Primary Examiner.*

LEO SMILOW, LEYLAND M. MARTIN, *Examiners.*

JOSEPH W. HARTARY, *Assistant Examiner.*